United States Patent
Eastwood

[15] 3,695,403
[45] Oct. 3, 1972

[54] SYNCHRONIZING MECHANISMS FOR POWER TRANSMISSIONS

[72] Inventor: Thomas Eastwood, Meltham, England

[73] Assignee: David Brown Tractors Limited

[22] Filed: March 2, 1970

[21] Appl. No.: 15,579

[30] Foreign Application Priority Data

March 6, 1969 Great Britain..........11,914/69

[52] U.S. Cl................................192/53 E, 192/53 F
[51] Int. Cl..............................................F16d 23/06
[58] Field of Search..................192/53 E, 53 F, 53 G

[56] References Cited

UNITED STATES PATENTS

| | | | |
|---|---|---|---|
| 3,365,039 | 1/1968 | Stott et al.................. | 192/53 F |
| 3,419,120 | 12/1968 | Stott.......................... | 192/53 F |
| 3,419,121 | 12/1968 | Stott.......................... | 192/53 F |
| 2,256,308 | 9/1941 | Bixby et al. .............. | 192/53 E |

FOREIGN PATENTS OR APPLICATIONS

| | | | |
|---|---|---|---|
| 1,098,083 | 3/1955 | France..................... | 192/53 G |

*Primary Examiner*—Allan D. Herrmann
*Attorney*—Norris & Bateman

[57] ABSTRACT

A device for synchronizing the speed of two torque transmitting members of a vehicle gearbox has a cone clutch engagable by actuating pins which pass through clearance holes in an axially slidable clutching member. Each pin has a shoulder which balks axial movement of the clutching member when the axes of the pins are moved out of alignment with the axes of the holes in said member when torque is transmitted by the cone clutch. The clutching member carries springs which centralize the pins axially of said member to ensure movement of the pins in unison with said member and to reduce wear of the pins and the clearance holes.

8 Claims, 4 Drawing Figures

INVENTOR
THOMAS EASTWOOD

BY Norris & Bateman
NORRIS & BATEMAN

SYNCHRONIZING MECHANISMS FOR POWER TRANSMISSIONS

BACKGROUND OF THE INVENTION

The invention relates to synchronizing mechanisms for power transmissions in which positive clutches are employed to selectively connect torque transmitting members, and more particularly to synchronizing mechanisms of the type having at least one positive clutch; a friction clutch associated with the or each positive clutch; one element of the or each friction clutch and one element of the associated positive clutch each being integral with or rigidly secured to a first torque transmitting member; the other element of said positive clutch being formed on a clutching member which is drivably connected to and is axially slidable on a second torque transmitting member; the other element of said friction clutch being carried on a plurality of pins, each pin passing through an offset axial clearance hole in the clutching member; each pin having at least one enlarged diameter portion forming a shoulder which balks axial movement of the clutching member when the axes of the pins are moved out of alignment with the axes of the holes in the clutching member by the circumferential component of the frictional force created by engagement of the friction clutch elements, and said engagement effecting synchronization of the speeds of rotation of the elements of the positive clutch prior to their engagement.

However, synchronizing mechanisms of the above type suffer from the disadvantage that wear of the pins and the holes in the clutching member takes place due to uncontrolled oscillations of the pins within the holes when the friction clutch elements are not engaged. It is also possible to slide the clutching member axially on the second torque transmitting member without corresponding movement of the pins and thus without engagement of the friction clutch elements if the pins happen by chance to be centrally aligned in the holes of the clutching member, and as a result synchronization of the speeds of rotation of the elements of the positive clutch does not always occur prior to their engagement.

SUMMARY OF THE INVENTION

The object of the invention, in its broadest concept, is to alleviate the second disadvantage referred to above, and in its preferred form to alleviate both of the above disadvantages.

According to the invention, in a synchronizing mechanism of the type referred to each pin is centralised longitudinally within the holes in the clutching member and urged to move in unison with said member by resilient means.

DESCRIPTION OF THE INVENTION

A preferred embodiment of the invention will now be described, by way of example only, with reference to the accompanying drawings of which:

Figure 1:
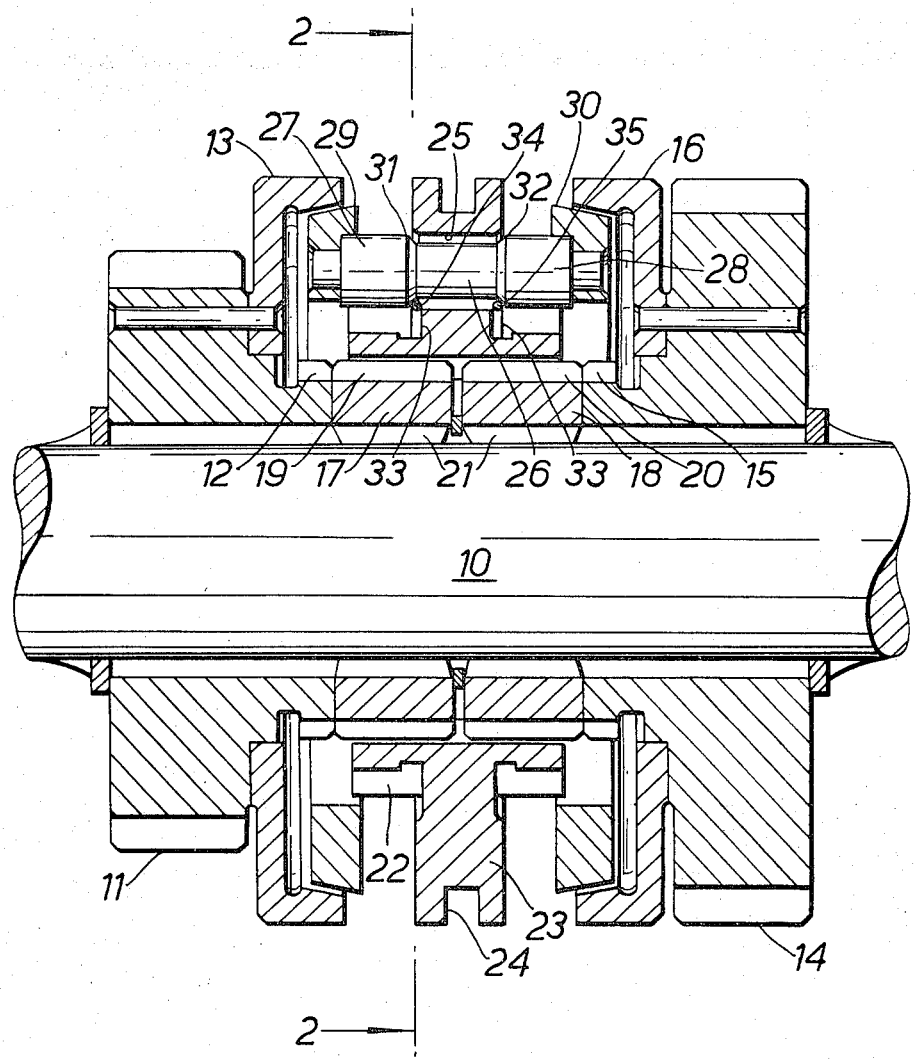
FIG. 1 is a sectional side elevation of a synchronizing mechanism for a vehicle power transmission.
Figure 2:
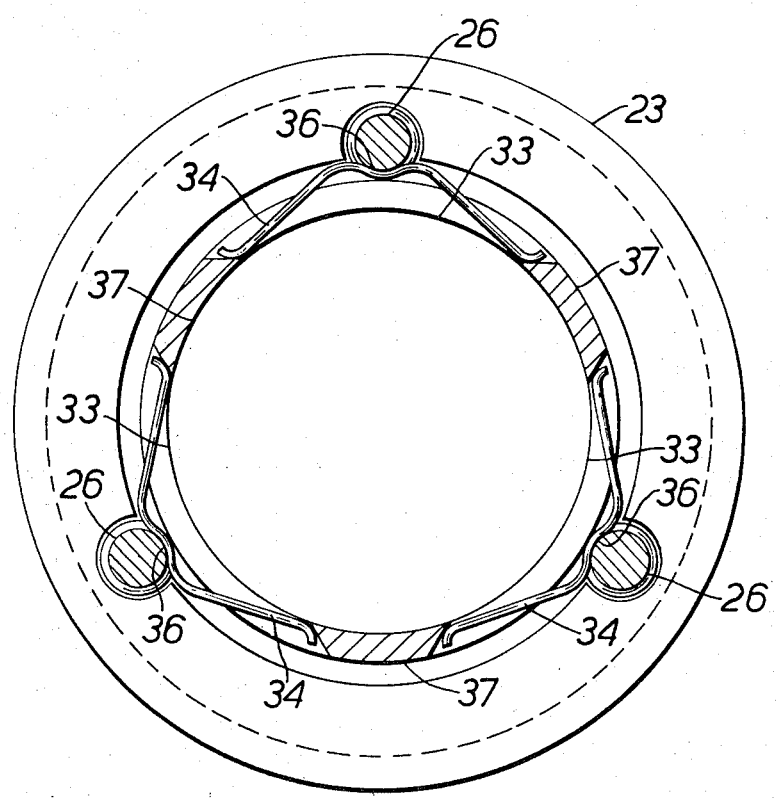
FIG. 2 is a section on the line 2—2 in FIG. 1 with parts omitted for clarity.

Referring now to FIGS. 1 and 2, a vehicle power transmission has a shaft 10 on which is rotatably mounted a gear 11 having positive clutch teeth 12 formed on it and a friction clutch element 13 rigidly secured to it. A gear 14 having positive clutch teeth 15 formed on it and a friction clutch element 16 rigidly secured to it is also rotatably mounted on the shaft 10. Two driven members 17 and 18, having external teeth 19 and 20 corresponding to the positive clutch teeth 12 and 15 respectively, are secured to the shaft 10 by means of splines 21. A clutching member 22 is slidable on the teeth 19 and 20 of the members 17 and 18, from a central, neutral position shown in FIG. 1, to selectively clutch one of the gears 11 and 14 to the shaft 10 by engaging the teeth 12 or the teeth 15. The clutching member 22 has a central portion 23 of enlarged diameter having an annular groove 24 in its periphery with which a selector fork (not shown), movable axially by means of a gear lever operated selector rod (not shown), is engagable. Three axial holes 25, whose axes are equally spaced on a common pitch circle, are drilled in the portion 23 of the member 22, and the ends of each of said holes are chamfered. A pin 26 having enlarged diameter portions 27, 28 passes co-axially through each hole 25. The portion 27 is secured to an annular friction clutch element 29 and the portion 28 is secured to an annular friction clutch element 30. The diameter of each hole 25 is such that the enlarged portions 27, 28 of its associated pin 26 are a sliding fit in said hole. The ends of the enlarged diameter portions 27, 28 of each pin 26 adjacent the clutching member 22 are chamfered to form inclined balking shoulders 31, 32. The clutching member 22 has two sets of three transverse milled slots 33. In each slot of one set there is located a single wire spring 34 and in each slot of the other set there is located a single wire spring 35. Each of the springs 34, 35 has a central depression 36 engaging one of the sloping shoulders 31, 32 of the associated pin 26, and the ends of each of the springs 34, 35 bear against an unmilled portion 37 of the clutching member 22 thus locating the associated pin 26 in the center of its hole 25.

In operation, the gears 11 and 14 are constantly driven and the ratio of the vehicle power transmission is varied by selectively clutching one of said gears to the shaft 10. When the gear 11 is to be clutched to the shaft 10, the gear lever operated selector rod (not shown) acts through the selector fork (not shown) located in the groove 24 to urge the clutching member 22 towards the gear 11. The depression 36 of each spring 34 bears against the shoulder 31 of the associated pin 26, urges said pin to move in unison with the clutching member 22 and thus causes the friction clutch element 29 to engage the friction clutch element 13 secured to the gear 11 before the clutching member 22 connects the teeth 12 formed on the gear 11 to the teeth 19 of the driven member 17. The circumferential component of the frictional force between the elements 29 and 13 moves each pin 26 in a circumferential direction against the centralising action of the springs 34, 35 so that the shoulder 31 of each pin 26 engages that chamfered end of its hold 25 nearest the gear 11. Further movement of the clutching member 22 towards the gear 11 is thus prevented until the frictional force between the elements 13 and 29 is reduced to such a small value that each pin 26 returns to the center of its associated hole 25 under the action of the springs 34, 35 whereupon each spring 34 is compressed into its slot 33 and the clutching member 22 slides over the enlarged diameter portions 27 of the pins 26 and connects the clutch teeth 12 on the gear 11 to the teeth 19 of the driven member 17. This connection is accomplished without clashing as the speeds of rotation of the gear 11 and the shaft 10 to which the member 17 is secured by the splines 21 are synchronized. In order to disengage the gear 11 from the shaft 10 the clutching member 22 is returned to its central, neutral position between the gears 11 and 14 shown in FIG. 1. Each pin 26 returns to its axially and longitudinally centralised position within its hole 25 under the action of its associated springs 34 and 35 which bear against the sloping shoulders 31 and 32 respectively.

When the gear 14 is to be clutched to the shaft 10, the gear lever operated selector fork (not shown) acts through the selector fork (not shown) located in the groove 24 to urge the clutching member 22 towards the gear 14. The depression 36 of each spring 35 bears against the shoulder portion 32 of the associated pin 26, urges said pin to move in unison with the clutching member 22 and causes the friction clutch element 30 to engage the friction clutch element 16 secured to the gear 14 before the clutching member 22 connects the teeth 15 formed on the gear 14 to the teeth 20 of the driven member 18. The frictional force between the elements 16 and 30 moves each pin 26 so that the shoulder 32 engages that chamfered end of its hole 25 nearest the gear 14, thus preventing further movement of the clutching member 22 towards the gear 14 until the speeds of rotation of said gear and the shaft 10 are synchronized. When synchronization occurs the clutching member 22
slides over the enlarged diameter portions 28 of the pins 26, compressing each spring 35 into its slot 33 and connecting the clutch teeth 15 on the gear 14 to the teeth 20 of the driven member 18. The gear 14 is thus connected to the shaft 10 as the driven member 18 is connected to said shaft by the splines 21.

Figure 3:
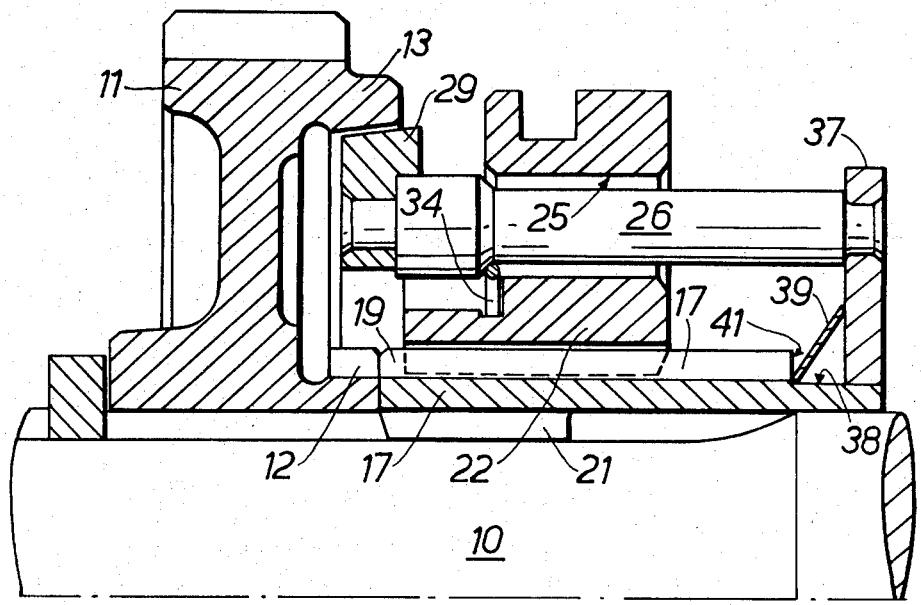
FIG. 3 is a sectional side elevation of a modified synchronizing mechanism.
Figure 4:
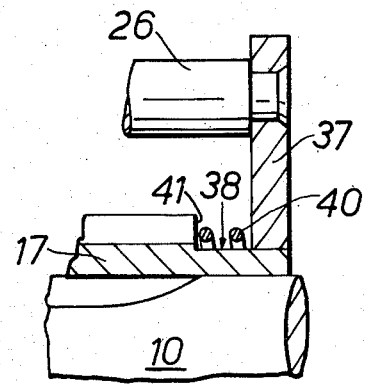
FIG. 4 shows a minor modification of the mechanism of FIG. 3.

Referring now to FIGS. 3 and 4, where it is required to connect only a single gear 11 to the shaft 10, the friction clutch element 30 attached to that end of each pin 26 remote from the gear 11 is replaced by an annular member 37 secured to each pin 26 and slidable on a reduced diameter portion 38 of the driven member 17. The springs 35 are replaced by a resilient device comprising one or more Belleville washers, that is to say plate springs 39 (see FIG. 3) or by a helical compression spring 40 (see FIG. 4) located co-axially of the shaft 10 on the portion of reduced diameter 38 between the annular member 37 and a shoulder 41 formed by the portion of reduced diameter 38 on the driving member 17 to provide the restoring force necessary for returning the pins 26 to their longitudinally centralised positions in the holes 25 in the clutching member 22.

What I claim is;

1. A synchronizing mechanism having at least one positive clutch; a friction clutch associated with each positive clutch; one element of each friction clutch and one element of its associated positive clutch forming part of a first torque transmitting member; the other element of said positive clutch being formed on a clutching member which is drivably connected to and is axially slidable on a second torque transmitting member; the other element of said friction clutch being carried on a plurality of pins, each pin passing through a radially offset axial clearance hole in the clutching member; and each pin having at least one enlarged diameter portion forming a balking shoulder that contacts the adjacent edge of its associated clearance hole to prevent engagement of the positive clutch if the axes of the pins are not aligned with the axes of the clearance holes, wherein there are provided resilient means engageable with the balking shoulders for urging the pins to move in unison with said clutching member.

2. A synchronizing mechanism according to claim 1, wherein each pin has only one balking shoulder and the resilient means comprise a set of springs located in transverse slots in the clutching member each of which is engageable with one of the balking shoulders, and wherein there is provided a resilient device disposed between an annular member secured to the end of each pin and a shoulder on the second torque transmitting member.

3. A synchronizing mechanism according to claim 2, wherein said resilient device is one or more plate springs.

4. A synchronizing mechanism according to claim 2, wherein said resilient device is a helical compression spring.

5. A synchronizing mechanism according to claim 1, wherein each pin has two oppositely inclined balking shoulders and said resilient means comprise two sets of springs located in transverse slots in the clutching member, each spring of one set being engageable with one of those shoulders inclined in one direction and each spring of the other set being engageable with one of those shoulders inclined in the other direction.

6. A synchronizing mechanism according to claim 2, wherein each spring is formed from a single wire and has a central depression engageable with the balking shoulder of the associated pin.

7. A synchronizing mechanism according to claim 5, wherein each spring is formed from a single wire and has a central depression engageable with the balking shoulder of the associated pin.

8. The synchronizing mechanism defined in claim 1 wherein said resilient means comprises spring means mounted on the clutching member, said spring means acting circumferentially of the clutch to normally centralize said pins in the respective clearance holes.

* * * * *